(12) United States Patent
Breu

(10) Patent No.: US 7,740,304 B1
(45) Date of Patent: Jun. 22, 2010

(54) UMBRELLA SEMI-TRAILER DRAG REDUCER

(76) Inventor: Thomas James Breu, 20 S. Blackhawk St., Janesville, WI (US) 53545-2623

( * ) Notice: Subject to any disclaimer, the term of this patent is extended or adjusted under 35 U.S.C. 154(b) by 18 days.

(21) Appl. No.: 12/381,051

(22) Filed: Mar. 7, 2009

(51) Int. Cl.
*B62D 35/00* (2006.01)
(52) U.S. Cl. .................. 296/180.4; 296/180.1
(58) Field of Classification Search ........... 296/180.4, 296/180.1
See application file for complete search history.

(56) References Cited

U.S. PATENT DOCUMENTS

| 2,569,983 | A | 10/1951 | Favre |
|---|---|---|---|
| 2,737,411 | A | 3/1956 | Potter |
| 3,425,740 | A | 2/1969 | De Vaughn |
| 4,006,932 | A | 2/1977 | Mc Donald |
| 4,116,482 | A | 9/1978 | Spiegel |
| 4,142,755 | A | 3/1979 | Keedy |
| 4,236,745 | A | 12/1980 | Davis |
| 4,601,508 | A | 7/1986 | Kerian |
| 4,682,808 | A | 7/1987 | Bilanin |
| 4,702,509 | A | 10/1987 | Elliott, Sr |
| 4,978,162 | A | 12/1990 | Labbe |
| 5,058,945 | A | 10/1991 | Elliott, Sr. |
| 5,236,347 | A | 8/1993 | Andrus |
| 5,498,059 | A | 3/1996 | Switlik |
| 5,823,610 | A | 10/1998 | Ryan |
| 6,092,861 | A | 7/2000 | Whelan |
| 6,309,010 | B1 | 10/2001 | Whitten |
| 6,409,252 | B1 | 6/2002 | Andrus |
| 6,467,833 | B1 | 10/2002 | Travers |
| 6,595,578 | B1 | 7/2003 | Calsoyds |
| 6,799,791 | B2 * | 10/2004 | Reiman et al. ........... 296/180.1 |
| 7,380,868 | B2 * | 6/2008 | Breidenbach ............ 296/180.1 |
| 2003/0205913 | A1 | 11/2003 | Leonard |

* cited by examiner

*Primary Examiner*—Joseph D Pape

(57) ABSTRACT

The Umbrella Semi-Trailer Drag Reducer is a device that reduces tractor-trailer aerodynamic drag, saving energy and reducing fuel consumption. The design includes a number of features similar to an umbrella, including flexible skin, metal ribs, quick-acting deployment, and compact stowage. The Umbrella Semi-Trailer Drag Reducer is designed to minimize installed cost, be robust and vandal resistant, and reduce the time needed for deployment to only a few seconds. The design includes two independent, paraboloid, mirrored halves, one mounted to each door. The bottom of each mirrored half is open, with a profile similar to one quadrant of an umbrella. Wide-throw hinges accommodate the collapsed stowed drag reducer. Turnbuckles maintain taught skin. The design allows easy retrofit for most existing semi-trailers. The drag reducer is mounted high above the road surface, with no part protruding beyond the top or sides of the semi-trailer.

3 Claims, 10 Drawing Sheets

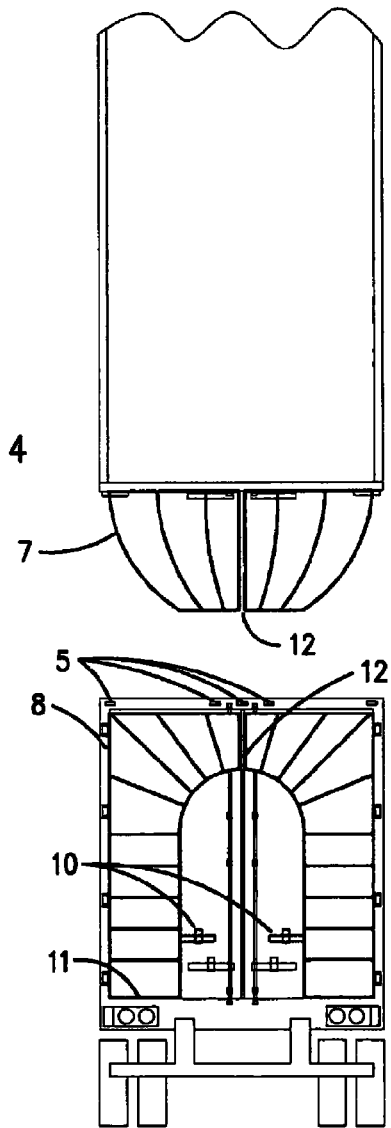
FIG. 4
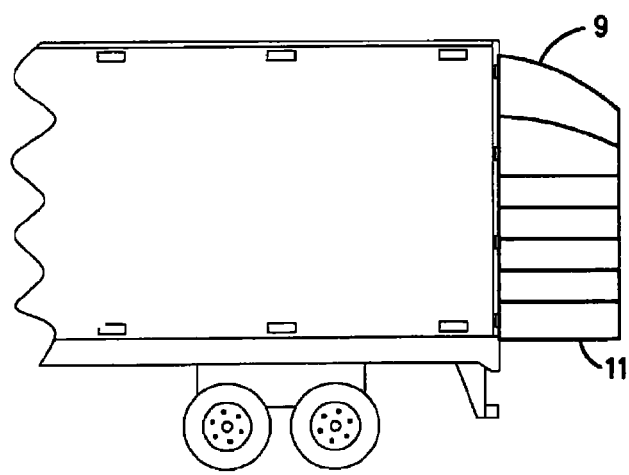
FIG. 6
FIG. 5

UMBRELLA SEMI-TRAILER DRAG REDUCER

CROSS REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

Semi-trailer drag is a well known phenomenon and there are numerous patents aimed at minimizing its effects. Reviewed drag reducers include U.S. Pat. Nos. 2,569,983; 2,737,411; 3,425,740; 4,006,932; 4,116,482; 4,142,755; 4,236,745; 4,601,508; 4,682,808; 4,702,509; 4,978,162; 5,058,945; 5,236,347; 5,498,059; 5,823,610; 6,092,861; 6,309,010; 6,409,252; 6,467,833; 6,595,578; and Patent Application Publication US 2003/0205913 A1.1. Because of the large number of miles driven by the U.S. tractor-trailer trucking fleet, a widely adopted semi-trailer drag reducer, even of small efficiency, would yield significant industry cost savings, reduced carbon footprint, and reduced dependence on imported and domestic fossil fuels.

Tractor airfairings (i.e., front cab roof mounted devices) are now almost universally installed on American long-haul tractor-trailers, but there is no corresponding acceptance of rear-mounted drag reducers. Tractor airfairings are configured and installed in many shapes and sizes, presumably of different aerodynamic efficiencies. Similarly, prior artwork of patented drag reducers has varied shapes and sizes, but none of these drag reducers are seen on American Interstate highways. Aerodynamic efficiency, apparently, is not the primary reason for lack of industry acceptance of drag reducers.

There are three obvious properties that any drag reducer must include, in addition to providing an aerodynamic benefit, to be commercially successful.

First, the drag reducer must be installed at minimum cost. Costs are recovered a gallon of fuel saved at a time. To achieve a viable payback, materials must remain cost effective.

Second, a successful design must be robust and vandal resistant. Complicated machinery or electronics, air scoops or pumps, and moving parts of all kinds must be minimized to avoid costly maintenance. While tractors rarely sit idle, semi-trailers frequently sit empty in all types of environments, sometimes for extended periods. Components of any perceived significant value are subject to extreme weather conditions and would be prey to vandals.

Third, the time and effort required to deploy or collapse and stow the drag reducer must be minimized. A single person (the driver) typically opens and closes the semi-trailer doors while standing on the road surface. The doors must be able to rotate a full 270 degrees and lay flat as semi-trailers are routinely backed into enclosed docks for loading and unloading.

When an aerodynamically designed drag reducer can be installed economically, is of robust design, and is able to be deployed and stowed quickly, only then will industry acceptance be assured. The Umbrella Semi-Trailer Drag Reducer uniquely satisfies these demands.

SUMMARY OF THE INVENTION

The Umbrella Semi-Trailer Drag Reducer provides aerodynamic benefit and optimizes the three identified parameters of low installed cost, robust design, and ease of operation.

The aerodynamic size and profile of the drag reducer is flexible and during production could be easily modified. Primary support of the skin is by aluminum or steel angle iron ribs which can be arranged and bent to many desired configurations.

The ribs are primarily concentrically arranged, so that when the drag reducer is collapsed, the ribs will nest allowing for a relatively flat stowed position. More or fewer ribs could be included to provide different surface profiles. The included artwork shows a drag reducer of truncated paraboloid design, with four ribs. Finite Element Analysis (FEA) programs can be used to model proposed geometries prior to fabrication and construction.

Openings in the drag reducer permit access to the door lock bars, and provide clearance and sight-lines for running lights, hinges, reflectors or other accessories. The included artwork assumes that a tarpaulin material will be used for the flexible skin, but transparent or translucent materials could be used or various sizes and shapes of rigid plastic material could be included to enhance aerodynamic performance.

The chosen construction materials and mounting hardware ensure a low installed cost. Standard door hinges are replaced with wide-throw hinges. Angle iron and bolts anchor the tarpaulin skin to the doors and ribs. The motive force for deployment is provided by operation of a standard semi-trailer door lock bar.

Most existing semi-trailers can be retrofit with the drag reducer by replacing the existing hinges with properly sized long-throw hinges. All other components are bolted onto the existing doors. Any truck with rear hinged doors is a candidate for retrofit.

The construction materials are not particularly susceptible to vandalism or theft. The only periodic maintenance would be the occasional rotation of turnbuckles to tighten the cables keeping the skin taught. Aerodynamic performance may decrease with a "loose" skin, but no damage or safety risk is noted, permitting routinely scheduled maintenance.

The Umbrella Semi-Trailer Drag Reducer can be deployed or collapsed in approximately 20 seconds, the time it takes an operator to open or close two standard semi-trailer lock bar door latches. The drag reducer is stowed as a part of the same 270 degree movement used to open standard semi-trailer doors. The drag reducer will be fully deployed after 180 degree handle rotation and the latch is rotated locking the handle, identical to current semi-trailer lock bar door closing methods. Since both the door closing mechanisms and the drag reducer deployment mechanisms are identical, no special training is required for the operator. This drag reducer deployment system, therefore, is as safe as current semi-trailer industry standards. A spring mechanism could be added to assist collapsing of the drag reducer. No part of the drag reducer protrudes beyond the top or sides of the semi-trailer so there is no visual impairment to the driver, and little chance of snagging. Because of the paraboloid shape of the drag reducer, there is little chance of damage even at tight radius turns.

BRIEF DESCRIPTION OF THE DRAWINGS

FIGS. 4-6 are the same as FIGS. 1-3, plus they show the outline of the fully deployed Umbrella Semi-Trailer Drag Reducer.

DETAILED DESCRIPTION OF THE INVENTION

Figure 1:
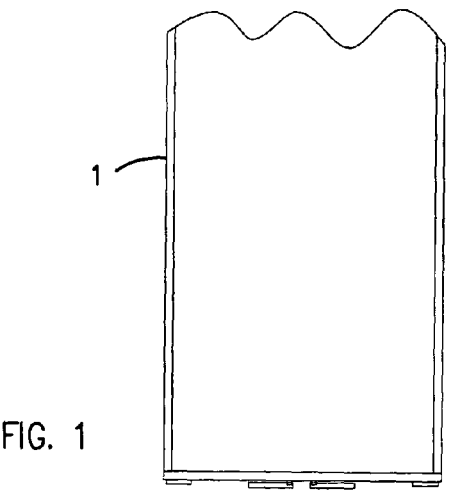
FIGS. 1-3 are the top, back and side views, respectively, of a standard semi-trailer.
Figure 3:
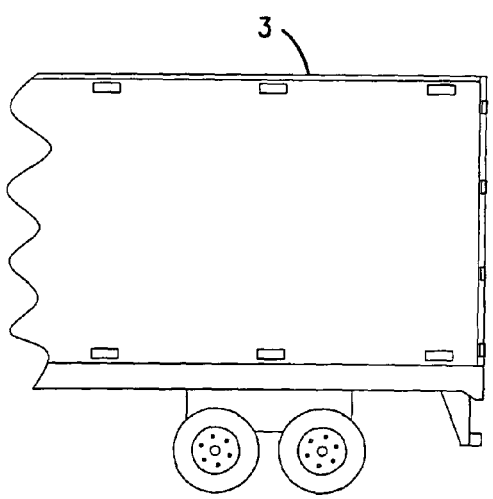
Figure 2:
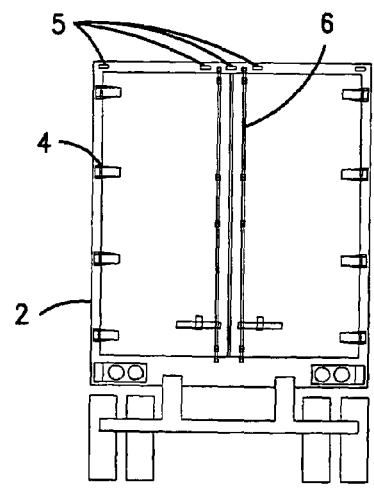

FIGS. 1-3 are profile views of a standard semi-trailer, top view 1, back view 2 and side view 3, onto which the Umbrella Semi-Trailer Drag Reducer will be mounted for the included artwork. It is recognized that different manufacturers of semi-trailers use different quantities of hinges 4 in different locations, may or may not include top running lights 5, have more than one lock bar 6 per door, and other features. The Umbrella Semi-Trailer Drag Reducer shape would be modified to meet different semi-trailer manufacturers' features.

FIGS. 4-6 are the same as FIGS. 1-3, plus they show the outline of the fully deployed Umbrella Semi-Trailer Drag Reducer in top view 7, back view 8, and side view 9. Deployment handles 10 are visible and accessible in back view 8. The location of deployment handles 10 can be adjusted, but need to remain low for ease of operation for a person standing on the road surface.

Top running lights 5 are exposed. On semi-trailers with no top running lights, the Umbrella Semi-Trailer Drag Reducer can be extended up, allowing a smooth transition for the top laminar air flow. Bar mounting stock would be modified as required, similar to FIG. 18.

The bottom of the drag reducer 11 is open, and can be fabricated to end higher or lower. Raising the bottom might be desired for ease of mounting, as to clear a low hinge. It is not anticipated that the bottom edge of the drag reducer will be lowered significantly, for several reasons. The long smooth top and sides of the semi-trailer permit development of laminar airflow, which can be extended and directed with the aerodynamically designed drag reducer. On the other hand, there is little aerodynamic benefit to extending the drag reducer lower since the wheels, underbody and other low portions of the semi-trailer promote turbulent air flow, which is not easily redirected to beneficial laminar flow. Brake light line-of-sight may be hindered with a lower drag reducer. Automobile rear-end crash scenarios could be complicated with a lower drag reducer.

The current artwork shows the two paraboloid drag reducer sections truncated, leaving an open area in the back-center, as seen in back view 8. The two mirrored halves are shown 12 as not touching, and would act completely independently from each other. As has already been noted, multiple aerodynamic configurations are viable, and the truncated portion of the paraboloid (or other shape) could be enlarged, reduced or even eliminated. The two halves could be linked for increased stability (See FIG. 10).

Figure 7:
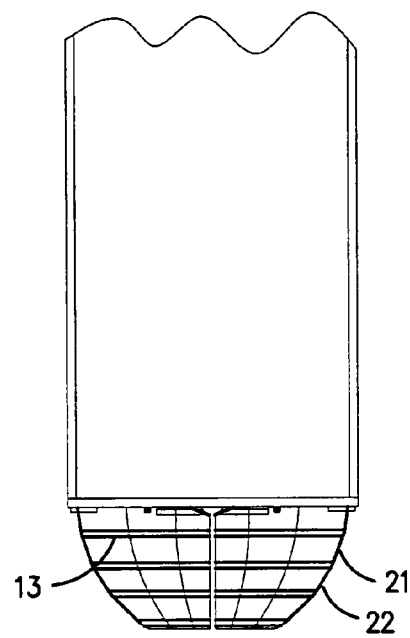
FIGS. 7-9 are similar to FIGS. 4-6, except they show more detail plus partial hidden structure, including primary support ribs and deployment system lock bar and lever arms.
Figure 9:
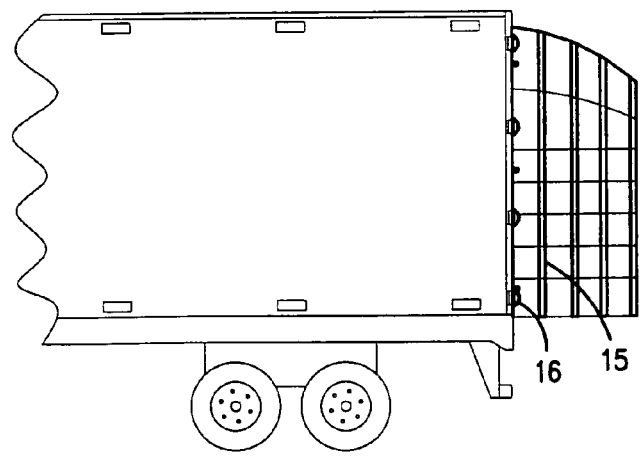
Figure 8:
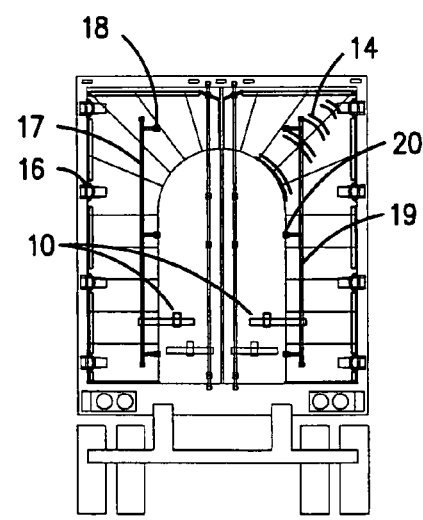

FIGS. 7-9 are similar to FIGS. 4-6, showing finer detail plus partial hidden structure. Four primary support main ribs for each half are included in the current artwork, with the main rib nearest the door identified at locations 13, 14, and 15. The skin of the drag reducer will need to be cut back to clear the wide-throw hinges 16 when being deployed or stowed. The deployment handles 10 are completely shown, along with lock bars 17, 19 and extension levers 18, 20. Three extension levers are shown on each lock bar, but the number, location and length of each extension lever can be adjusted as needed. At the end of each extension lever 18, 20 a cable or cables would be attached, plus pulleys and scissor jacks to deploy or collapse the drag reducer (See FIG. 10). It is recognized that a scissor jack is an arrangement of pivoting links and levers, and that cables and pulleys function to transmit and change direction of forces. Depending on final placement of components, any or all of the cables, pulleys and scissor lifts could be replaced with links and levers. The rotational direction of the deployment lock bars could be reversed.

The final profile of the tarpaulin skin, as shown in FIG. 7 and FIG. 9, is not a smooth and continuous paraboloid, but a series of line segments 21, 22 approximating a paraboloid. By adding more ribs, or curved fittings at the ribs (See FIG. 22), additional smoothing of the profile can be achieved.

Figure 10:
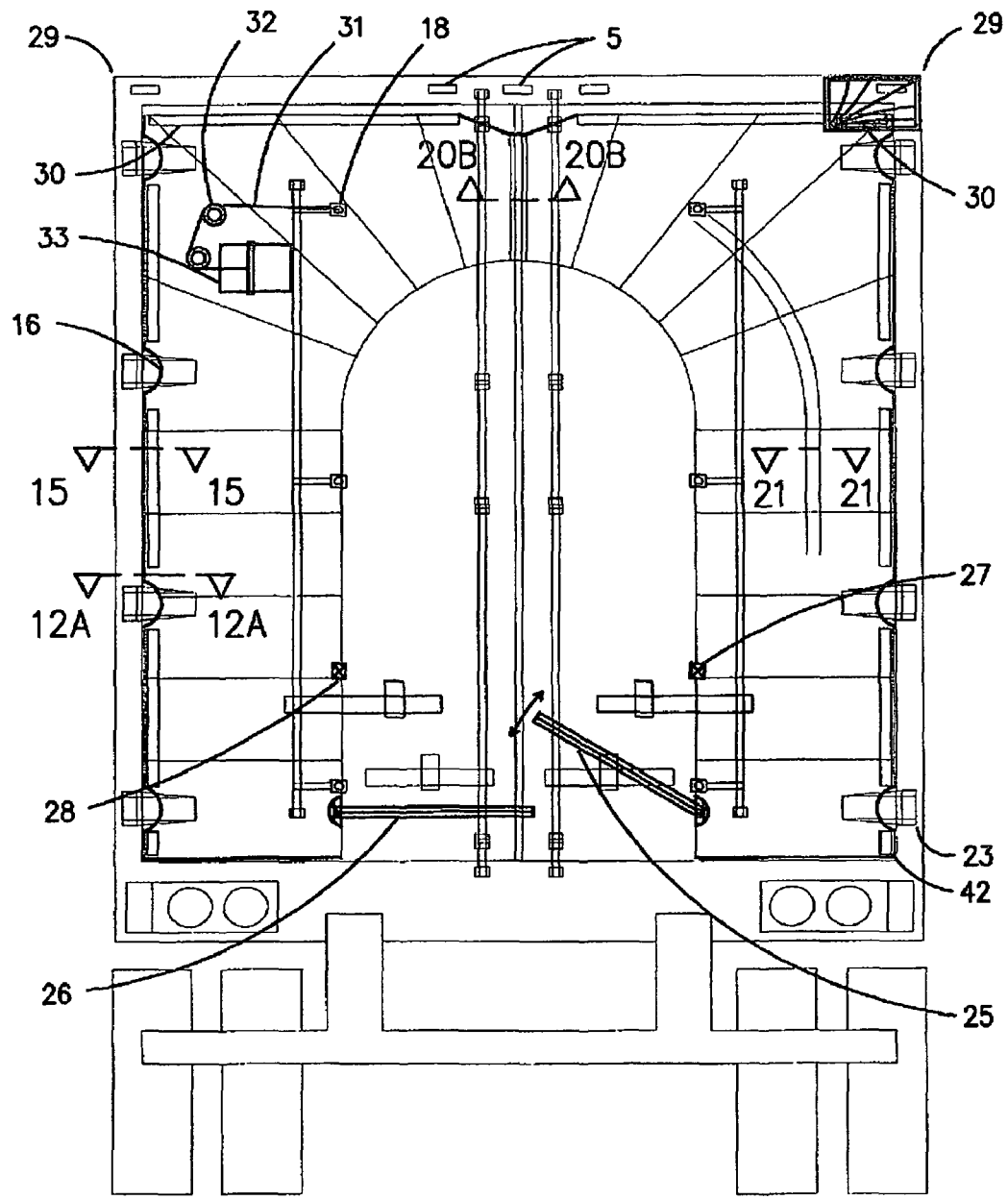
FIG. 10 is an enlargement of FIG. 8, including more detail plus section callouts.

FIG. 10 is an enlargement of back view FIG. 8, including section callouts and additional detail. Section view of a wide-throw hinge is shown FIG. 12A. Section view of a bar stock mounting at door edge is shown FIG. 15. Section view of a bar and yoke optional reinforcement is shown FIG. 20B. Section view of a main rib profile is shown FIG. 21.

As shown in FIG. 10, if the lowest hinge 23 on the semi-trailer door is too close to the door bottom, the lowest bar stock mounting 42 can be omitted. Also see FIG. 15 for a section view of typical bar stock mounting 42. Some area of the tarpaulin skin will be lost, but this lost area could be recaptured, if desired, by the addition of rigid framing pieces.

Optional reinforcement could be provided using pivoting support bars 25, 26, along with clips 27, 28 for bar storage when drag reducer is in the collapsed position.

At upper corners 29 an aerodynamically shaped preformed plastic or metal corner piece could be used to more efficiently redirect the laminar flow. The corner bar stock piece 30 shown in FIG. 10 could be extended, similar to bar stock piece 46 shown in FIG. 18, providing robust connection points for the corner piece. Where top running lights 5 are present, as shown in this artwork, skin extensions would need to avoid the lights, or a transparent or translucent material could be used.

One possible cable 31 and pulley 32 arrangement to one scissor jack 33 is shown from extension lever end 18. Multiple cables could be extended from each extension lever end. The linkage from the top of the scissor jack could be connected to one or multiple main support ribs.

The tarpaulin skin at wide-throw hinges 16 will need to be trimmed back to clear the wide-throw hinge as the door rotates open or closed.

Figures 11A, 11B, 11C:
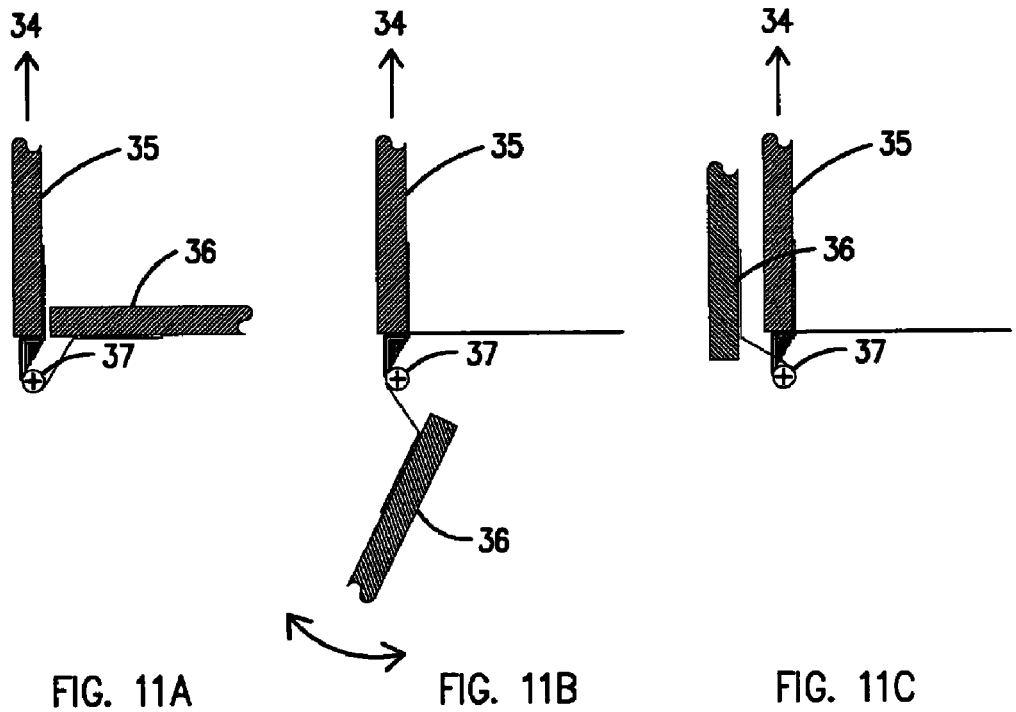
FIGS. 11A-11C, 12A-12B show a standard rear door semi-trailer hinge in comparison to a wide-throw hinge.

FIGS. 11A-11C show a section view of a standard rear door semi-trailer hinge 37, fully closed FIG. 11A, part open at about 100 degrees of rotation FIG. 11B, and fully open at 270 degrees rotation FIG. 11C. For orientation, arrow 34 points to the tractor and front of the semi-trailer, the trailer wall is 35, and the semi-trailer door is 36.

Figures 12A, 12B:
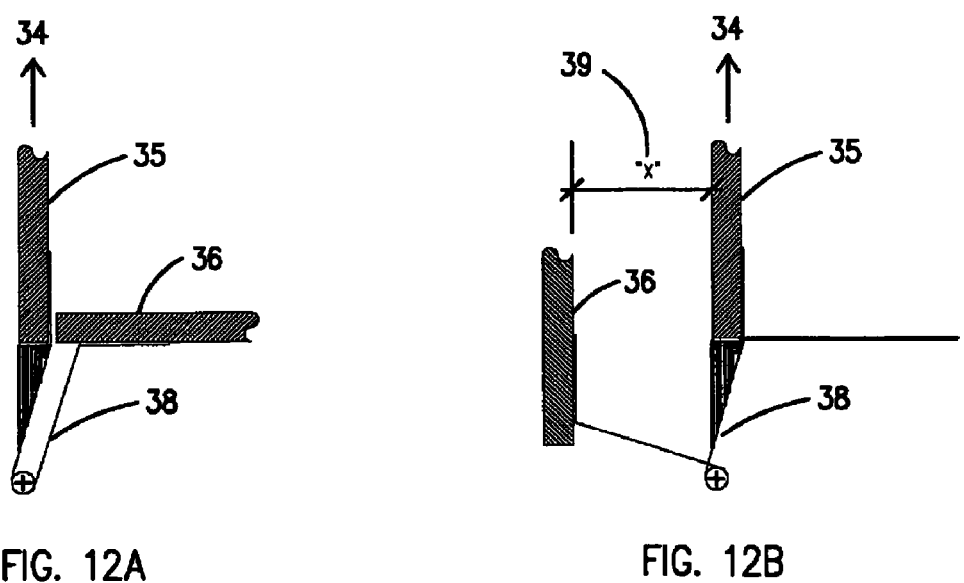

FIGS. 12A-12B show a section view of a wide-throw rear door semi-trailer hinge 38, fully closed FIG. 12A, and fully open at 270 degrees rotation FIG. 12B. The fully open wide-throw hinge FIG. 12B permits an arbitrary distance as needed "X" 39 based upon the collapsed configuration of the drag reducer mechanism. The door hold backs, whether loop style or otherwise, used on a standard semi-trailer can be easily extended to accommodate the new larger distance.

Figures 13, 14:
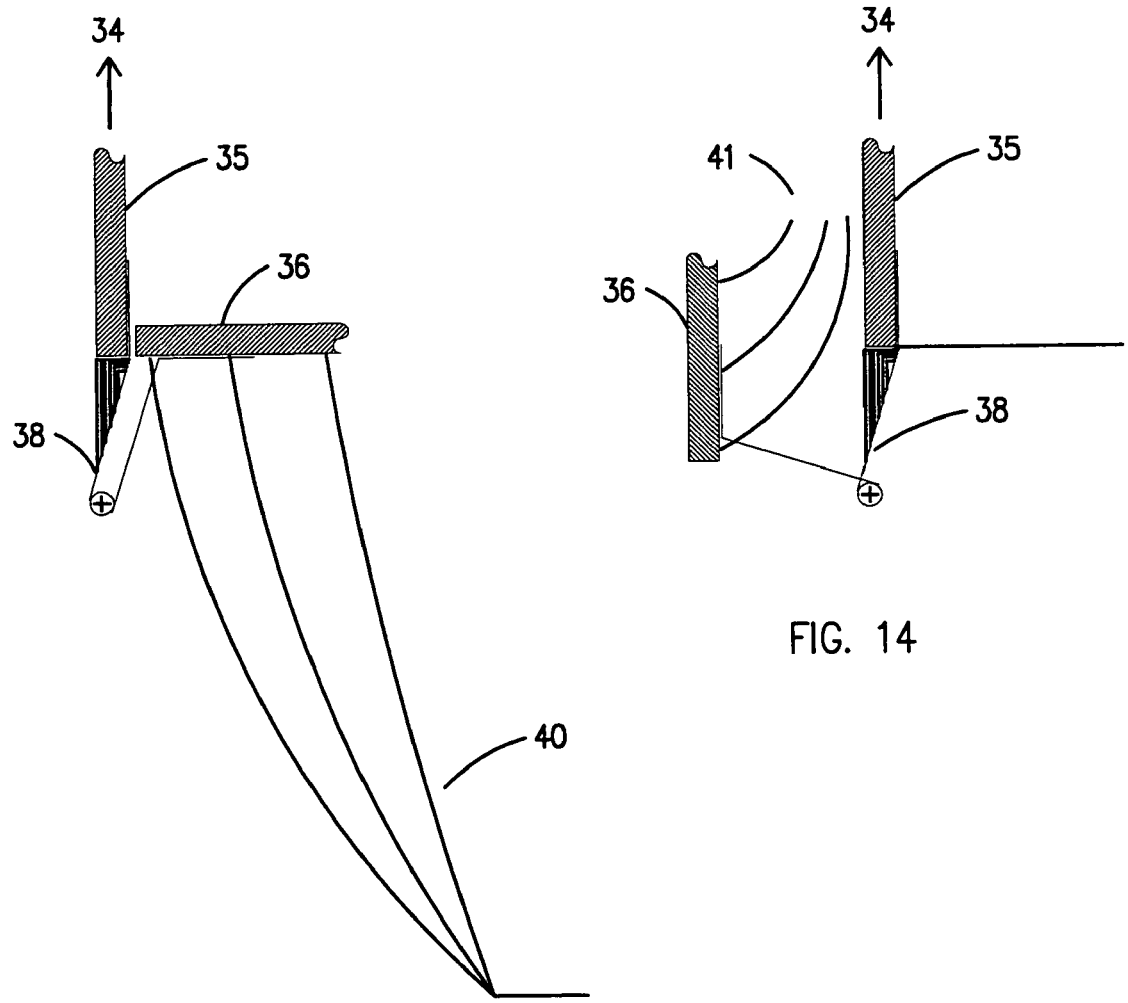
FIGS. 13-14 are similar to FIGS. 12A-12B, plus they indicate drag reducer orientation.

FIGS. 13-14 are similar to FIGS. 12A-12B, showing installed wide-throw hinges 38. FIG. 13 includes schematic lines indicating the fully deployed drag reducer orientation 40 when the door is closed. FIG. 14 includes schematic lines indicating the fully stowed drag reducer orientation 41 when the door is open. Springs could be used to assist in the collapsing of the drag reducer, but because of the drag reducer's simplicity, robustness, nesting design, and multiple anchor points, it is anticipated that gravity will do most of the work, with the operator providing the final push to engage the (lengthened) door hold backs.

Figure 15:
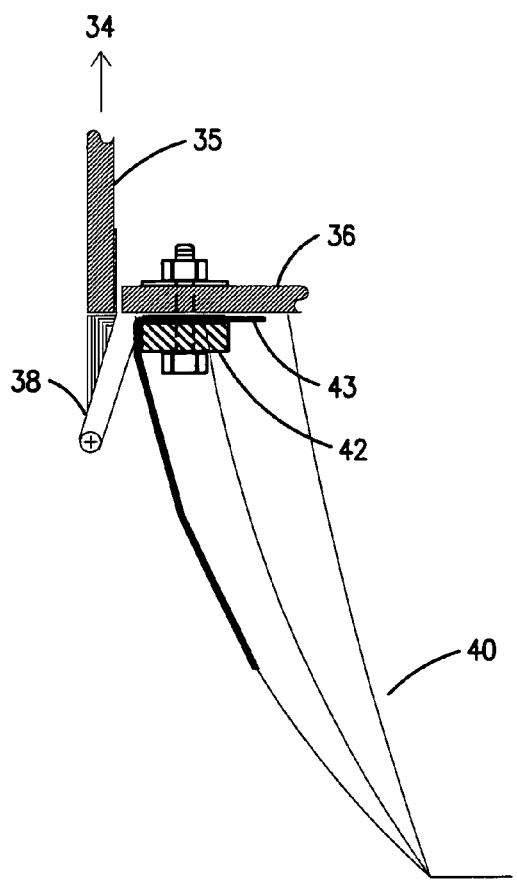
FIG. 15 is a section view from FIG. 10, bar stock mounting of tarpaulin to door edge.

FIG. 15 shows a section view of basic bar stock mounting of tarpaulin skin to door edge. Aluminum or steel bar stock 42 is bolted through the semi-trailer door, pinching the tarpaulin skin 43. Gauge of bar stock, style and number of bolts and nuts are flexible.

Figure 16:
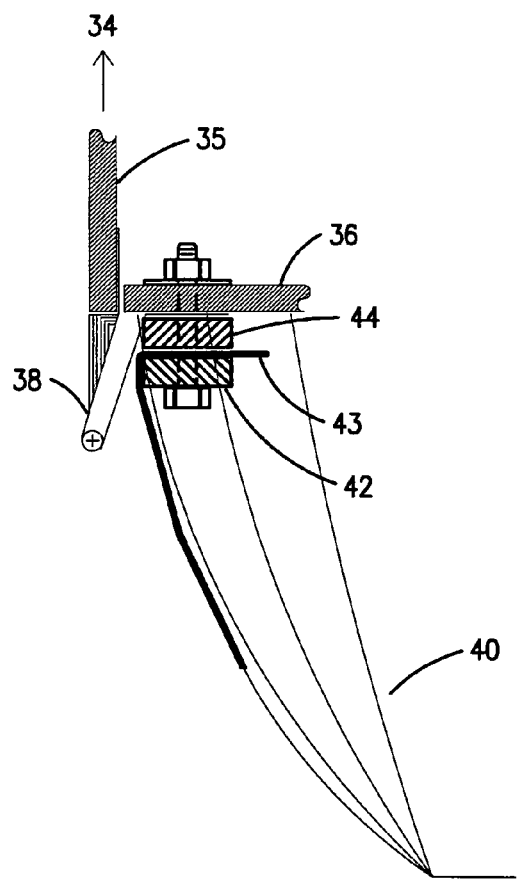
FIGS. 16-18 show possible improved bar stock mounting options, similar to FIG. 15, but providing more control or better aerodynamic properties.
Figure 17:
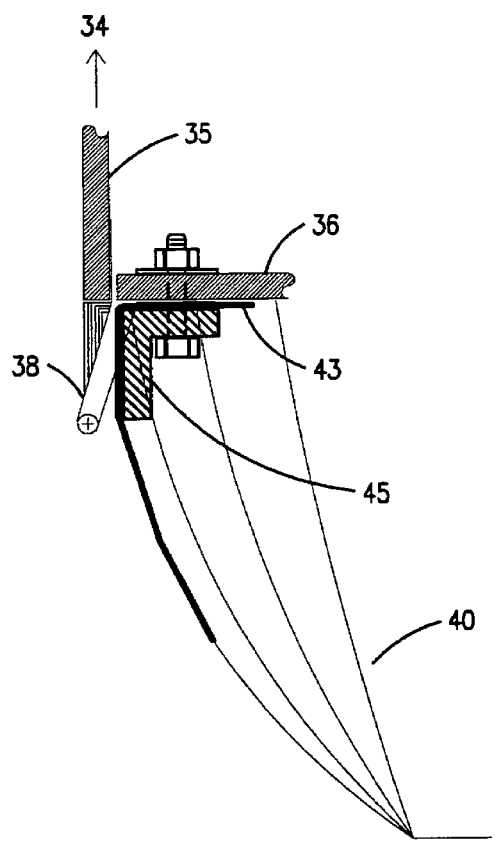
Figure 18:
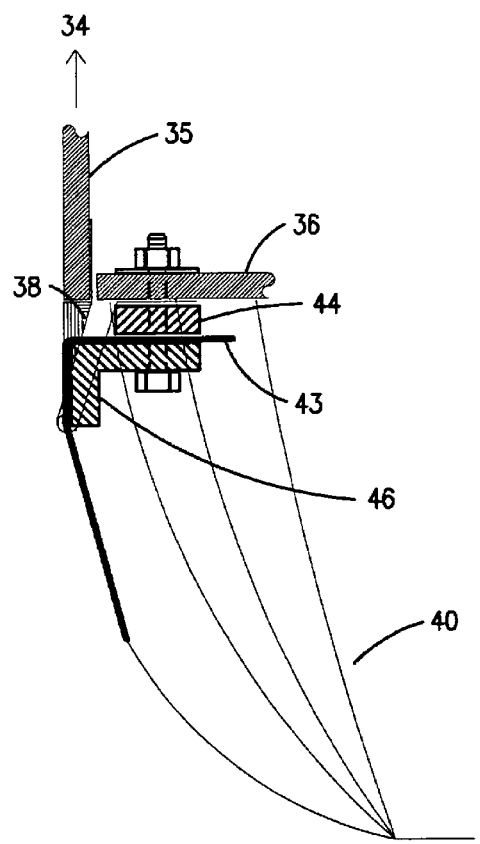

FIGS. 16-18 show additional modified bar stock mounting options, similar to FIG. 15, but providing more tarpaulin control or better aerodynamics. An additional strip of bar stock 44 would provide enhanced clamping of the tarpaulin skin. Replacing bar stock 42 with angle iron 45 may have aerodynamic benefits. FIG. 18 includes both an additional strip of bar stock 44 plus an extended profile angle iron 46, aligning the tarpaulin skin with the exterior semi-trailer wall, providing optimum laminar flow interface. FIG. 18 with an even more extended profile angle iron 46, could be used at the top of the semi-trailer where no running lights are present.

The edges of the bar stock and angle iron could be rounded to minimize tearing stress on the tarpaulin, perhaps eliminating the need for tarpaulin reinforcement. The outer profile of the angle iron could be rounded or include an additional curved finish piece to help smooth the exterior skin profile. The optimum balance must be maintained between marginally improved aerodynamic benefit with incremental fabrication and installation costs.

Figure 19:
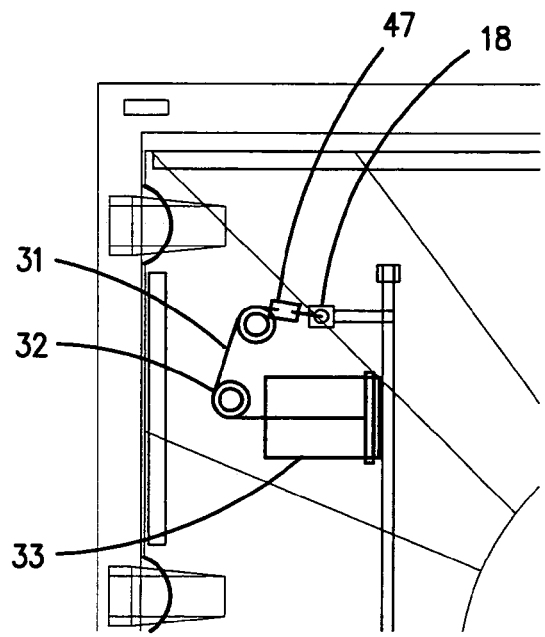
FIG. 19 shows a scissor lift in the relaxed or stowed position, with the lock bar lever arm rotated 180 degrees from that shown in FIG. 10.

FIG. 19 is a slightly enlarged image of cable 31, pulley 32 and scissor lift 33 from FIG. 10. FIG. 19, however, shows the end of extension lever 18 in the fully collapsed position, rotated 180 degrees from the fully deployed position shown in FIG. 10, allowing the scissor lift to collapse. Additionally, a turnbuckle 47 is shown. The turnbuckle 47 provides individual cable adjustment to counteract skin stretching over time, keeping the skin taught. As previously described, depending on final configuration, cables could be replaced with links. In such a case the turnbuckles would connect to the links.

Figures 20A, 20B:
FIGS. 20A-20B are sections from FIG. 10, a possible bar and yoke assembly for the two drag reducer halves, should reinforcement be desired.

FIGS. 20A-20B show a section view from FIG. 10 of a possible bar and yoke assembly for the two drag reducer halves, should reinforcement be desired. FIG. 20A shows the bar and yoke before engagement. FIG. 20B shows the bar and yoke after engagement. As illustrated in FIGS. 4-5, the two drag reducer mirrored halves are shown 12 as not touching, and would act completely independently from each other. If a decision is made for reinforcement, the deployment sequence may be affected. The marginal aerodynamic benefit of increased skin area needs to be balanced with the additional cost and complication of the drag reducer.

Figure 21:
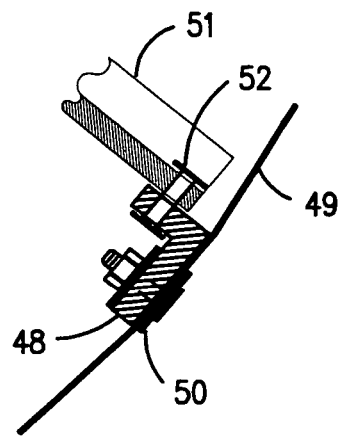
FIG. 21 is a section view from FIG. 10, a typical angle iron rib mounting to tarpaulin.

FIG. 21 shows a section view from FIG. 10, a typical angle iron main rib mounting to the tarpaulin skin. Angle iron 48 is bolted to tarpaulin skin 49. Special attention should be given to the size of washer 50, maintaining a low profile for aerodynamic benefit plus sufficient area to reduce point stress loads on the tarpaulin skin, extending service life. Angle iron 51 serves as the rotatable link from the top of a scissor lift and is rotatably pinned 52 to main rib 48, allowing link rotation as the tarpaulin skin is deployed or collapsed. Profiles, gauges and materials chosen for the link and main rib are made based on optimized cost and durability.

Figure 22:
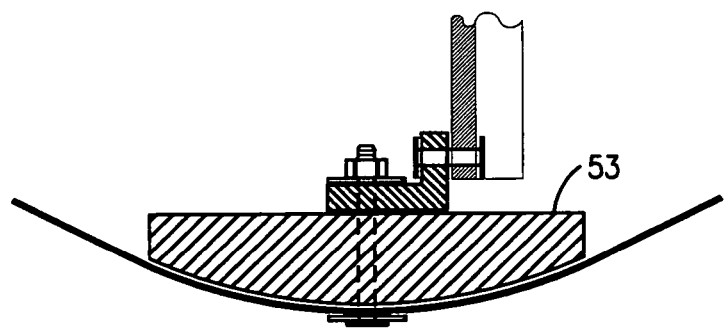
FIG. 22 is similar to FIG. 21, plus it includes an optional profile modification piece.

FIG. 22 is similar to FIG. 21, including an added optional profile modification piece 53 which streamlines and curves the tarpaulin skin surface, improving aerodynamic performance.

Figure 23:
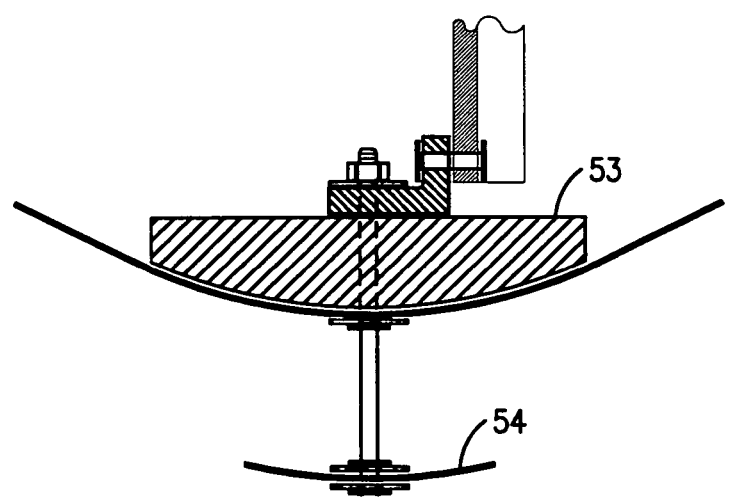
FIG. 23 is the same as FIG. 22, except it also includes an optional airfoil.

FIG. 23 is similar to FIG. 22, showing both a profile modification piece 53 plus an optional airfoil 54 for improved aerodynamic performance. Of course, any protrusion from the tarpaulin skin would be subject to an increased likelihood of damage.

In conclusion, the Umbrella Semi-Trailer Drag Reducer is unique in that it provides aerodynamic benefit and optimizes the three identified parameters of low installed cost, robust and vandal resistant design, and ease of operation.

What is claimed is:

1. An aft facing drag reducer disposed on the rear end of a vehicle having a pair of swinging doors, the drag reducer comprising:
a truncated, rearwardly extending paraboloid section mounted on each door so as to leave an open area in the center portion of the rear end of the vehicle, each said section having a movable frame portion covered by a flexible skin material, said flexible skin material being mounted to both the vehicle and said movable frame portion, and means to move said movable frame portion including an extension lever which drives a cable around at least one pulley to activate a scissor jack mechanism, said scissor jack mechanism moves said movable frame between a stowed position and a deployed position via a linkage interconnecting the top of the scissor jack to said movable frame portion.

2. The drag reducer as set forth in claim 1, wherein said movable frame portion consists of a nesting structure.

3. The drag reducer as set forth in claim 1, wherein said flexible skin material primarily consists of a tarpaulin material.

* * * * *